(12) United States Patent
Wang et al.

(10) Patent No.: US 9,685,870 B2
(45) Date of Patent: Jun. 20, 2017

(54) PHASE-CUT PRE-REGULATOR AND POWER SUPPLY COMPRISING THE SAME

(71) Applicants: Charlie Wang, Shenzhen (CN); Sang Cheol Moon, Bucheon (KR); Young-Bae Park, Anyang (KR)

(72) Inventors: Charlie Wang, Shenzhen (CN); Sang Cheol Moon, Bucheon (KR); Young-Bae Park, Anyang (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 694 days.

(21) Appl. No.: 13/899,240

(22) Filed: May 21, 2013

(65) Prior Publication Data

US 2013/0258722 A1    Oct. 3, 2013

Related U.S. Application Data

(63) Continuation-in-part of application No. 13/239,762, filed on Sep. 22, 2011.

(30) Foreign Application Priority Data

Feb. 8, 2011    (KR) .................. 10-2011-0011122

(51) Int. Cl.
    H02M 3/335    (2006.01)
    H02M 1/42    (2007.01)
    H02M 5/293    (2006.01)
    H02M 1/00    (2006.01)

(52) U.S. Cl.
    CPC ..... *H02M 3/33507* (2013.01); *H02M 1/4258* (2013.01); *H02M 5/293* (2013.01); *H02M 2001/007* (2013.01); *H02M 2001/0035* (2013.01); *Y02B 70/126* (2013.01); *Y02B 70/16* (2013.01)

(58) Field of Classification Search
    CPC ............ H02M 3/33507; H02M 5/293; H02M 2001/007; H02M 2001/0035; H02M 3/335; Y02B 70/126; Y02B 70/16
    USPC .... 363/84, 89, 127; 323/223, 269, 271–274, 323/284, 299, 303
    See application file for complete search history.

(56) References Cited

U.S. PATENT DOCUMENTS

| 4,797,599 A | 1/1989 | Ferrence et al. |
| 4,879,625 A * | 11/1989 | Potenzone ............ H02H 3/207 307/130 |
| 5,065,104 A * | 11/1991 | Kusko .................. G01R 31/025 324/122 |
| 5,157,574 A * | 10/1992 | Tuusa ............................ 361/56 |

(Continued)

FOREIGN PATENT DOCUMENTS

| CN | 1309459 A | 8/2001 |
| CN | 1338868 A | 3/2002 |

(Continued)

*Primary Examiner* — Gustavo Rosario Benitez
(74) *Attorney, Agent, or Firm* — Okamoto & Benedicto LLP

(57) ABSTRACT

A power supply includes a phase-cut pre-regulator. The phase-cut pre-regulator comprises a switching device connected between a line voltage and an input voltage of a bulk capacitor and a comparator receiving the line voltage and a reference voltage, comparing the line voltage with hysteresis reference voltages based on the reference voltage, and switching the switching device according to the compared result.

13 Claims, 6 Drawing Sheets

(56) References Cited

U.S. PATENT DOCUMENTS

| | | | |
|---|---|---|---|
| 5,559,395 A | | 9/1996 | Venkitasubrahmanian et al. |
| 5,615,097 A | * | 3/1997 | Cross ............................ 363/84 |
| 5,666,042 A | * | 9/1997 | Lewis ..................... H02J 7/022 |
| | | | 320/163 |
| 5,808,847 A | * | 9/1998 | Ferrazzi .................. G05F 1/618 |
| | | | 307/86 |
| 6,172,466 B1 | | 1/2001 | Ki et al. |
| 6,469,917 B1 | | 10/2002 | Ben-Yaakov |
| 8,503,144 B2 | | 8/2013 | Tsai et al. |
| 2002/0080542 A1 | * | 6/2002 | Mendoza ............... H02H 3/207 |
| | | | 361/90 |
| 2002/0145413 A1 | | 10/2002 | Oshio |
| 2003/0035311 A1 | * | 2/2003 | Phadke ........................... 363/89 |
| 2003/0202305 A1 | * | 10/2003 | Engel et al. ................. 361/93.8 |
| 2009/0251929 A1 | | 10/2009 | Choi |
| 2010/0014331 A1 | | 1/2010 | Moon et al. |
| 2010/0027299 A1 | | 2/2010 | Fang |
| 2010/0225251 A1 | * | 9/2010 | Maruyama ......... H05B 33/0815 |
| | | | 315/307 |
| 2010/0226153 A1 | * | 9/2010 | Kaulio .................. H02M 7/219 |
| | | | 363/77 |
| 2010/0309694 A1 | | 12/2010 | Huang et al. |
| 2011/0210712 A1 | | 9/2011 | Tagare |
| 2011/0215780 A1 | | 9/2011 | Lee et al. |
| 2011/0305051 A1 | | 12/2011 | Yang et al. |
| 2012/0201055 A1 | | 8/2012 | Moon et al. |

FOREIGN PATENT DOCUMENTS

| | | |
|---|---|---|
| CN | 1404207 A | 3/2003 |
| CN | 101262170 A | 9/2008 |
| CN | 101399492 A | 4/2009 |
| CN | 101714831 A | 5/2010 |

* cited by examiner

PHASE-CUT PRE-REGULATOR AND POWER SUPPLY COMPRISING THE SAME

CROSS-REFERENCE TO RELATED APPLICATIONS

This application is a continuation-in-part of U.S. patent application Ser. No. 13/239,762 filed with the United States Patent and Trademark Office on Sep. 22, 2011, which claims priority to and the benefit of Korean Patent Application No. 10-2011-0011122 filed in the Korean Intellectual Property Office on Feb. 8, 2011. The just mentioned disclosures are incorporated herein by reference in their entirety.

BACKGROUND OF THE INVENTION (a) Field of the Invention

The present invention relates to a phase-cut pre-regulator and a power supply comprising the phase-cut pre-regulator.

(b) Description of the Related Art

In a power meter application, the power supply unit (PSU) should sustain a very high input voltage, with some customers stating 650 VAC in their specifications. Previous solutions have been to use a flyback converter to deliver the high input voltage to load directly. However, this has the following drawbacks.

One E-cap (electrolytic capacitor) cannot sustain the rectified voltage, and thus, two or more E-caps in series are needed. A voltage balance circuit must also be applied due to leakage current differences. However, limitations of the balance circuit will cause bad reliability, and multiple E-caps and balance circuits both cost money.

A switching device of a flyback should have more than 1500V breakdown voltage. Such devices always have higher switching and conducting losses and the price is high.

A secondary rectifier should also have a higher breakdown voltage. The forwarding voltage of an HV (high voltage) diode is higher than an LV (low voltage) diode, so the efficiency of high a Vin flyback will be lower.

SUMMARY OF THE INVENTION

Embodiments of the present invention provide a phase-cut pre-regulator and a power supply for decreasing the voltage applied to the input side of a DC-DC converter.

An embodiment of the present invention provides a phase-cut pre-regulator comprising a switching device connected between a line voltage and an input voltage of a bulk capacitor and a comparator receiving the line voltage and a reference voltage, comparing the line voltage with hysteresis reference voltages based on the reference voltage, and switching the switching device according to the compared result.

The comparator is configured to output a switching signal to turn-off the switching device when the line voltage is higher than a first hysteresis reference voltage of the hysteresis reference voltages.

The comparator is configured to output the switching signal to turn-on the switching device when the line voltage is lower than a second hysteresis reference voltage of the hysteresis reference voltages.

The first hysteresis reference voltage is higher than the second hysteresis reference voltage.

The bulk capacitor is charged by the line voltage in a turn-on time of the switching device and energy stored in the bulk capacitor is discharged in a turn-off time of the switching device.

Another embodiment of the present invention provides a power supply comprising a rectifier circuit rectifying an AC input to generate a line voltage, a bulk capacitor, a switching device connected between the rectifier circuit and the bulk capacitor, and a comparator receiving the line voltage and a reference voltage, comparing the line voltage with hysteresis reference voltages based on the reference voltage, and switching the switching device according to the compared result.

Yet another embodiment of the present invention provides a power supply comprising a first rectifier circuit rectifying a first phase AC input of a multi-phase AC input to generate a first line voltage, a bulk capacitor, a first switching device connected between the first line voltage and the bulk capacitor, and a first comparator receiving the first line voltage and a reference voltage, comparing the first line voltage with hysteresis reference voltages based on the reference voltage, and switching the first switching device according to the compared result.

The first rectifier comprises a first diode connected to the first phase AC input and the first switching device and at least a second diode connected to the first phase AC input and a ground.

The first comparator is configured to output a first switching signal to turn-off the first switching device when the first line voltage is higher than a first hysteresis reference voltage of the hysteresis reference voltages.

The first comparator is configured to output the first switching signal to turn-on the first switching device when the first line voltage is lower than a second hysteresis reference voltage of the hysteresis reference voltages.

The first hysteresis reference voltage is higher than the second hysteresis reference voltage.

The bulk capacitor is charged by the first line voltage when the first line voltage is highest among line voltages generated by rectifying the multi-phase AC input in the turn-on time of the first switching device and the energy stored in the bulk capacitor is discharged in the turn-off time of all of the switching devices connected to the line voltages or all of the line voltages are lower than the voltage on the bulk capacitor.

The power supply further comprises a second rectifier circuit rectifying a second phase AC input of the multi-phase AC input to generate a second line voltage, a second switching device connected between the second line voltage and the bulk capacitor, and a second comparator receiving the second line voltage and the reference voltage, comparing the second line voltage with the hysteresis reference voltages, and switching the second switching device according to the compared result.

The second rectifier comprises a third diode connected to the second phase AC input and the second switching device and at least a fourth diode connected to the second phase AC input and a ground.

The second comparator is configured to output a second switching signal to turn-off the second switching device when the second line voltage is higher than a first hysteresis reference voltage of the hysteresis reference voltages.

The second comparator is configured to output the second switching signal to turn-on the second switching device when the second line voltage is lower than a second hysteresis reference voltage of the hysteresis reference voltages.

DETAILED DESCRIPTION OF THE EMBODIMENTS

Figure 1:
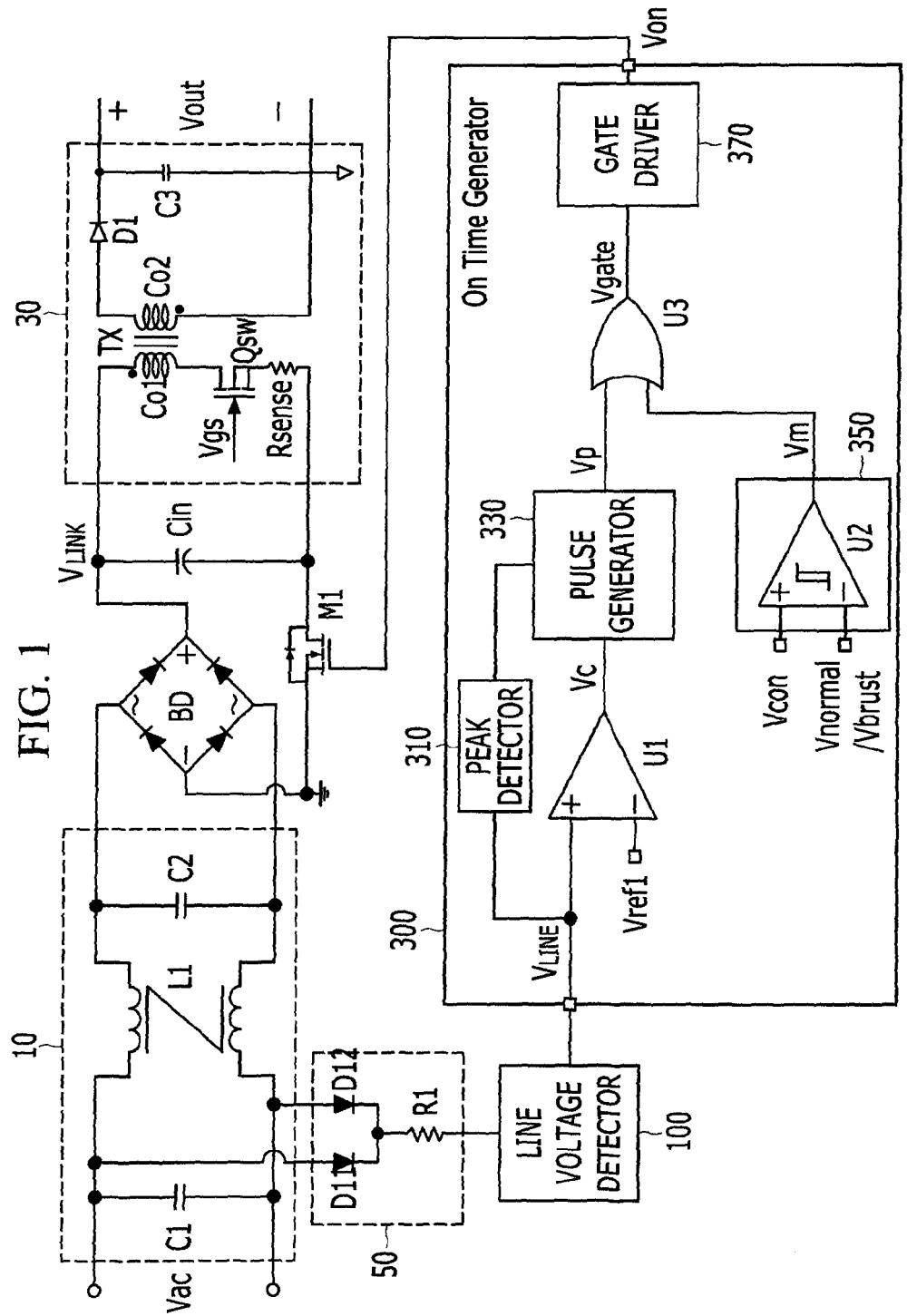
FIG. 1 is a schematic diagram showing a circuit of a power supply according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "connected" to another element, the element may be "directly connected" to the other element or "electrically connected" to the other element through a third element.

In addition, unless explicitly described to the contrary, the word "comprise" and variations such as "comprises" or "comprising" will be understood to imply the inclusion of stated elements but not the exclusion of any other elements.

Hereinafter, referring to drawings, a power supply according to an embodiment of the present invention will be described.

FIG. 1 is a schematic diagram showing a circuit of a power supply according to an embodiment of the present invention.

As shown in FIG. 1, the power supply according to an embodiment of the present invention of which input is an AC line voltage Vac and of which output is a DC voltage Vout includes an electromagnetic interference (EMI) filter 10, a bridge diode BD, a link capacitor Cin, a link voltage control transistor M1, a DC-DC converter 30, a line voltage rectifier 50, a line voltage detector 100, and an on-time generator 300.

The EMI filter 10 reduces the EMI of the AC line voltage Vac. The EMI filter 10 according to an embodiment of the present invention includes a capacitor C1, a choke coil L1, and a capacitor C2. Two terminals of the capacitor C1 are provided with the AC line voltage Vac. Two input terminals of the choke coil L1 are connected to the two terminals of the capacitor C1, respectively. Two output terminals of the choke coil L1 are connected to the two terminals of the capacitor C2, respectively.

The bridge diode BD rectifies an EMI-reduced AC line voltage. Two input terminals of the bridge diode BD are connected to the two terminals of the capacitor C2, respectively. One of two output terminals of the bridge diode BD is connected to one terminal of the link capacitor Cin, and the other of two output terminals of the bridge diode BD is connected to a source electrode of the link voltage control transistor M1.

The link capacitor Cin performs low-pass filtering of the EMI-reduced AC line voltage to generate a link voltage $V_{LINK}$. The one terminal of the link capacitor Cin is connected to one of two terminals of the bridge diode BD, and the other terminal of the link capacitor Cin is connected to a drain electrode of the link voltage control transistor M1.

The link voltage control transistor M1 can consist of a metal oxide semiconductor field-effect transistor (MOSFET). The link capacitor Cin is charged during on-time of the link voltage control transistor M1, and the link capacitor Cin is not charged during off-time of the link voltage control transistor M1.

The DC-DC converter 30 with the link voltage $V_{LINK}$ as an input outputs the DC voltage Vout. The DC-DC converter 30 according to an embodiment of the present invention includes a transformer TX, a power switch Qsw, a sensing resister Rsense, a diode D1, and a capacitor C3. One terminal of a primary coil Co1 of the transformer TX is connected to the one terminal of the link capacitor Cin, and the other terminal of the primary coil Co1 is connected to the drain electrode of the power switch Qsw. One terminal of a secondary coil Co2 of the transformer TX is connected to an anode of the diode D1, and the other terminal of the secondary coil Co2 is connected to one terminal of the capacitor C3. A drain electrode of the power switch Qsw is connected to the one terminal of the primary coil Co1 of the transformer TX, a source electrode of the power switch Qsw is connected to one terminal of the sensing resister Rsense, and a gate electrode of the power switch Qsw is provided with a switching control signal Vgs. The one terminal of the sensing resister Rsense is connected to the source electrode of the power switch Qsw, and the other terminal of the sensing resister Rsense is connected to the one terminal of the link capacitor Cin. A detection voltage occurring from the sensing resister Rsense can be used for generating the switching control signal Vgs. The anode of the diode D1 is connected to the one terminal of the secondary coil Co2 of the transformer TX, and a cathode of the diode D1 is connected to the one terminal of the capacitor C3. The one terminal of the capacitor C3 is connected to the cathode of the diode D1, and the other terminal of the capacitor C3 is connected to the other terminal of the secondary coil Co2 of the transformer TX.

The line voltage rectifier 50 rectifies the AC line voltage Vac. The line voltage rectifier 50 according to an embodiment of the present invention includes a diode D11, a diode D12, and a resister R1. An anode of the diode D11 is connected to one terminal of the AC line voltage Vac, and an anode of the diode D12 is connected to the other terminal of the AC line voltage Vac. A cathode of the diode D11 is connected to a cathode of the diode D12. One terminal of the resister R1 is connected to the cathode of the diode D11, and the other terminal of the resister R1 outputs a rectified AC line voltage.

The line voltage detector 100 detects the rectified AC line voltage to output an AC line detection voltage $V_{LINE}$.

The on-time generator 300 outputs a link voltage control signal Von based on the AC line detection voltage $V_{LINE}$. The on-time generator 300 according to an embodiment of the present invention includes a comparator U1, a peak detector 310, a pulse generator 330, a mode instruction signal generator 350, an OR gate U3, and a gate driver 370.

The comparator U1 compares the AC line detection voltage $V_{LINE}$ with a reference voltage Vref1 to generate a comparison signal Vc. The comparator U1 according to an embodiment of the present invention can consist of an operational amplifier (OP AMP). A non-inverted terminal of the comparator U1 is provided with the AC line detection voltage $V_{LINE}$, and an inverted terminal of the comparator U1 is provided with the reference voltage Vref1.

The peak detector 310 detects and outputs a peak voltage of the AC line detection voltage $V_{LINE}$.

The pulse generator 330 generates a pulse signal Vp by using the comparison signal Vc corresponding to an output signal of the comparator U1 and the peak voltage corresponding to an output of the peak detector 310. The pulse generator 330 will be described below.

The mode instruction signal generator 350 outputs a mode instruction signal Vm according to an operation mode of the DC-DC converter 30. If the operation mode of the DC-DC converter 30 corresponds to a normal operation mode, the mode instruction signal generator 350 according to an embodiment of the present invention outputs the mode instruction signal Vm with a high level. If the operation mode of the DC-DC converter 30 corresponds to a standby operation mode, the mode instruction signal generator 350 according to an embodiment of the present invention outputs the mode instruction signal Vm with a low level.

The mode instruction signal generator 350 according to an embodiment of the present invention includes a hysteresis comparator U2. A non-inverted terminal of the hysteresis comparator U2 is provided with a feedback signal Vcon, and an inverted terminal of the hysteresis comparator U2 is provided with a mode reference voltage Vnormal/Vburst. The feedback signal Vcon is a signal having information corresponding to the output DC voltage Vout. The feedback signal Vcon is used for determining turn-off timing of the power switch Qsw. For generating this feedback signal Vcon, a photo-coupled photodiode and a transistor can be used. Since a person of ordinary skill in the art can easily know this, the concrete description will be omitted. The mode reference voltage Vnormal/Vburst corresponds to a reference voltage for determining the operation mode of the DC-DC converter 30. If the DC-DC converter 30 operates at the normal operation mode, the feedback signal Vcon is higher than the mode reference voltage Vnormal/Vburst, so the hysteresis comparator U2 outputs a gate signal Vgate with a high level. On the contrary, if the DC-DC converter 30 operates at the burst operation mode, the feedback signal Vcon is lower than the mode reference voltage Vnormal/Vburst, the hysteresis comparator U2 outputs the gate signal Vgate with a low level.

The OR gate U3 performs an OR operation with the pulse signal Vp and the mode instruction signal Vm as inputs to generate the gate signal Vgate.

The gate driver 370 converts the gate signal Vgate into the link voltage control signal Von that can control the link voltage control transistor M1.

Next, referring to FIG. 2, the pulse generator 330 according to an embodiment of the present invention will be described.

Figure 2:
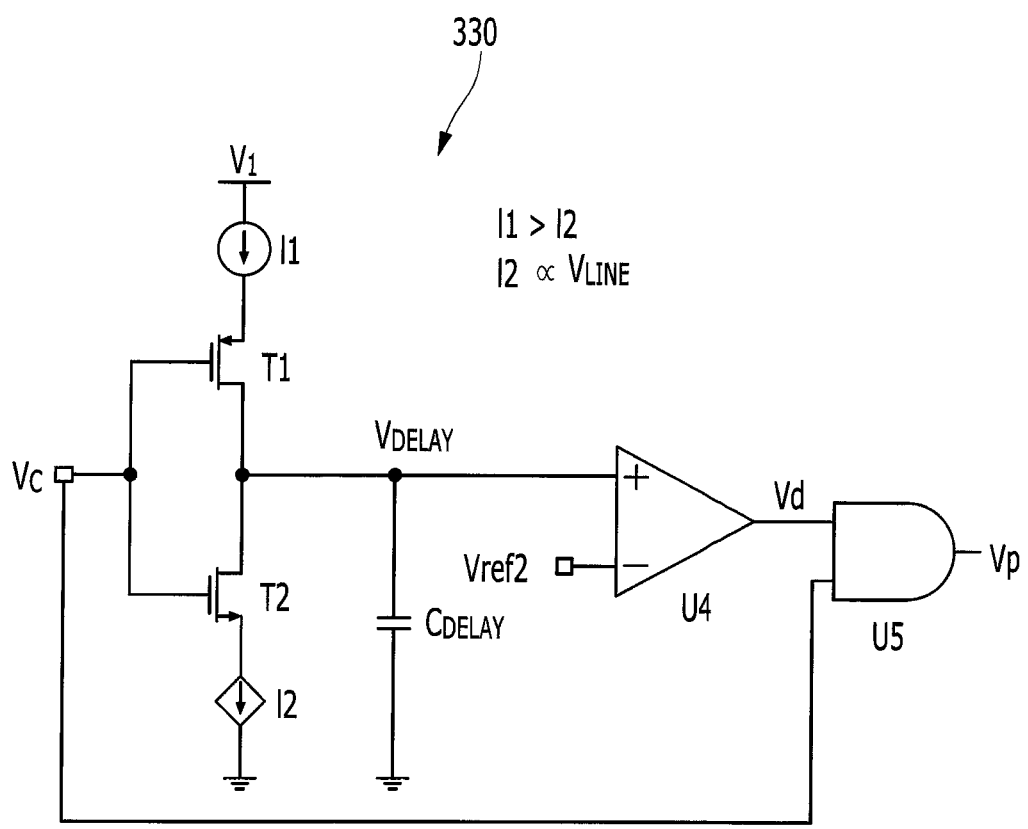
FIG. 2 is a schematic diagram showing a circuit of a pulse generator according to an embodiment of the present invention.

FIG. 2 is a schematic diagram showing a circuit of a pulse generator according to an embodiment of the present invention.

As shown in FIG. 2, the pulse generator 330 according to an embodiment of the present invention includes an independent current source I1, a PMOS transistor (p-channel MOSFET) T1, a voltage-dependent current source I2, an NMOS transistor (n-channel MOSFET) T2, a delay capacitor Cdelay, a comparator U4, and an AND gate U5.

The independent current source I1 provides a constant current. The voltage-dependent current source I2 sinks a current proportional to the peak voltage of the AC line detection voltage $V_{LINE}$ detected by the peak detector 310. The magnitude of the current sunken by the voltage-dependent current source I2 is smaller than the magnitude of the current provided by the independent current source I1.

The PMOS transistor T1 has a source electrode connected to the independent current source I1, a gate electrode connected to the comparison signal Vc, and a drain electrode connected to a drain electrode of the NMOS transistor T2.

The NMOS transistor T2 has a drain electrode connected to the drain electrode of the PMOS transistor T1, a gate electrode connected to the comparison signal Vc, and a source electrode connected to the voltage-dependent current source I2.

The delay capacitor $C_{DELAY}$ has one terminal connected to the drain electrode of the PMOS transistor T1 and the other terminal connected to a ground. A delay voltage $V_{DELAY}$ corresponds to a voltage for charging the delay capacitor $C_{DELAY}$.

The comparator U4 compares the delay voltage $V_{DELAY}$ with a reference voltage Vref2 to generate a comparison voltage Vd. The comparator U4 can consist of an operational amplifier (OP AMP). A non-inverted terminal of the comparator U4 is provided with the delay voltage $V_{DELAY}$, and an inverted terminal of the comparator U4 is provided with the reference voltage Vref2.

The AND gate U5 performs an AND operation with a comparison voltage Vc and the comparison voltage Vd as inputs to generate the pulse signal Vp.

Next, referring to FIG. 3, an operation of the power supply according to an embodiment of the present invention will be described.

Figure 3:
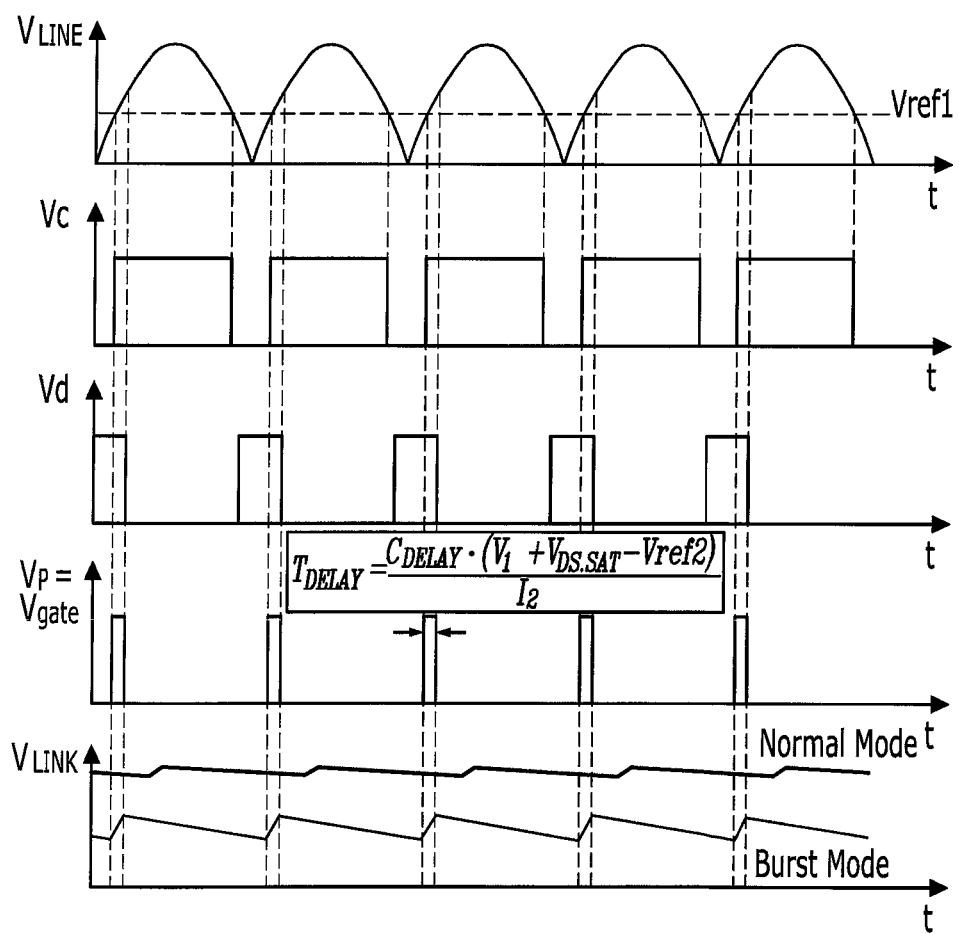
FIG. 3 is a waveform diagram showing an operation of a power supply according to an embodiment of the present invention.

FIG. 3 is a waveform diagram showing an operation of a power supply according to an embodiment of the present invention.

The line voltage detector 100 outputs the AC line detection voltage $V_{LINE}$ with a rectified AC voltage waveform as shown in FIG. 3.

The comparator U1 compares the AC line detection voltage $V_{LINE}$ with the reference voltage Vref1 to output the comparison signal Vc with a waveform as shown in FIG. 3.

In an interval where the AC line detection voltage $V_{LINE}$ is lower than the reference voltage Vref1, the comparator U1 outputs the comparison signal Vc with a low level. At this time, the PMOS transistor T1 is turned on and the NMOS transistor T2 is turned off by the comparison signal Vc with the low level, so the delay capacitor $C_{DELAY}$ is charged by the independent current source I1.

In the other hand, in an interval where the AC line detection voltage $V_{LINE}$ is higher than the reference voltage Vref1, the comparator U1 outputs the comparison signal Vc with the high level. At this time, the PMOS transistor T1 is turned off and the NMOS transistor T2 is turned on by the comparison signal Vc with the high level, so the delay capacitor $C_{DELAY}$ is discharged by the voltage-dependent current source I2.

If the magnitude of the delay voltage $V_{DELAY}$ is lower than the magnitude of the reference voltage Vref2 due to discharge of the delay capacitor $C_{DELAY}$, the comparator U4 outputs a comparison signal Vd with the low level.

The AND gate U5 performs an AND operation with the comparison voltage Vc and the comparison voltage Vd as inputs, so it generates the pulse signal Vp of which the high-level interval is $T_{DELAY}$.

A rising edge of this pulse signal Vp corresponds to a start time when the delay capacitor $C_{DELAY}$ starts discharging. The high-level interval of the pulse signal Vp corresponds to discharging time of the delay capacitor $C_{DELAY}$. The discharging time of the delay capacitor $C_{DELAY}$ is determined by the amount of charges of the delay capacitor $C_{DELAY}$ and the magnitude of the discharging current.

Therefore, a delay time $T_{DELAY}$ corresponding to the discharging time of the delay capacitor $C_{DELAY}$ can be determined as shown in Equation 1.

$$T_{DELAY} = \frac{C_{DELAY} \cdot (V_1 + V_{DS\text{-}SAT} - Vref2)}{I_2} \quad \text{(Equation 1)}$$

On the other hand, in a case that the operation mode of the DC-DC converter 30 corresponds to the normal operation mode, the mode instruction signal generator 350 outputs the mode instruction signal Vm with the high level. With this, the OR gate U3 always outputs the gate signal Vgate with the high level, and the link voltage control transistor M1 is always turned on. Therefore, the link voltage $V_{LINK}$ has a relatively large value as shown in FIG. 3.

On the contrary, in a case that the operation mode of the DC-DC converter 30 corresponds to the standby operation mode, the mode instruction signal generator 350 outputs the mode instruction signal Vm with the low level, so the OR gate U3 outputs the gate signal Vgate with the same waveform as the pulse signal Vp. That is, the link voltage control transistor M1 is turned on and the link capacitor Cin is charged only in an interval where the pulse signal Vp corresponds to the high level. Also, the link voltage control transistor M1 is turned off and the link capacitor Cin is discharged by a light load in an interval where the pulse signal Vp corresponds to the low level. Therefore, the magnitude of the link voltage $V_{LINK}$ in both terminals of the link capacitor Cin is relatively small.

Next, referring to Table 1, the efficiency of the power supply according to an embodiment of the present invention will be described.

TABLE 1

| DC-DC CONVERTER | | | Pin (W) | | | |
| --- | --- | --- | --- | --- | --- | --- |
| Vo(V) | Io(A) | Po(W) | 42Vac | 115Vac | 230Vac | 265Vac |
| 5 | 0 | 0 | 0.021 | 0.023 | 0.028 | 0.032 |
| 5 | 0.005 | 0.025 | 0.058 | 0.059 | 0.066 | 0.069 |
| 5 | 0.01 | 0.05 | 0.087 | 0.087 | 0.094 | 0.098 |
| 5 | 0.015 | 0.075 | 0.123 | 0.123 | 0.13 | 0.134 |
| 5 | 0.02 | 0.1 | 0.158 | 0.157 | 0.165 | 0.17 |

As seen in Table 1, in a light-load circumstance, the larger the magnitude of the link voltage $V_{LINK}$ is, the worse the efficiency is, because the power consumption of the power supply increases.

However, because it is possible to reduce the magnitude of the link voltage $V_{LINK}$ as 42 Vac according to an embodiment of the present invention, the power supply has good efficiency.

The addition of the link voltage control transistor M1 cause an additional power loss in the normal operation mode. However, the additional power loss can be ignored because the loss is 130 mW in a 30 W-load when a 400 V 1 ohm NMOS transistor is used. Also, because it is not necessary to use a large NMOS transistor for the link voltage control transistor M1, the additional cost is not large.

Another embodiment of the present invention provides a phase-cut pre-regulator to decrease the voltage applied to the input side of a DC-DC converter.

Figure 4:
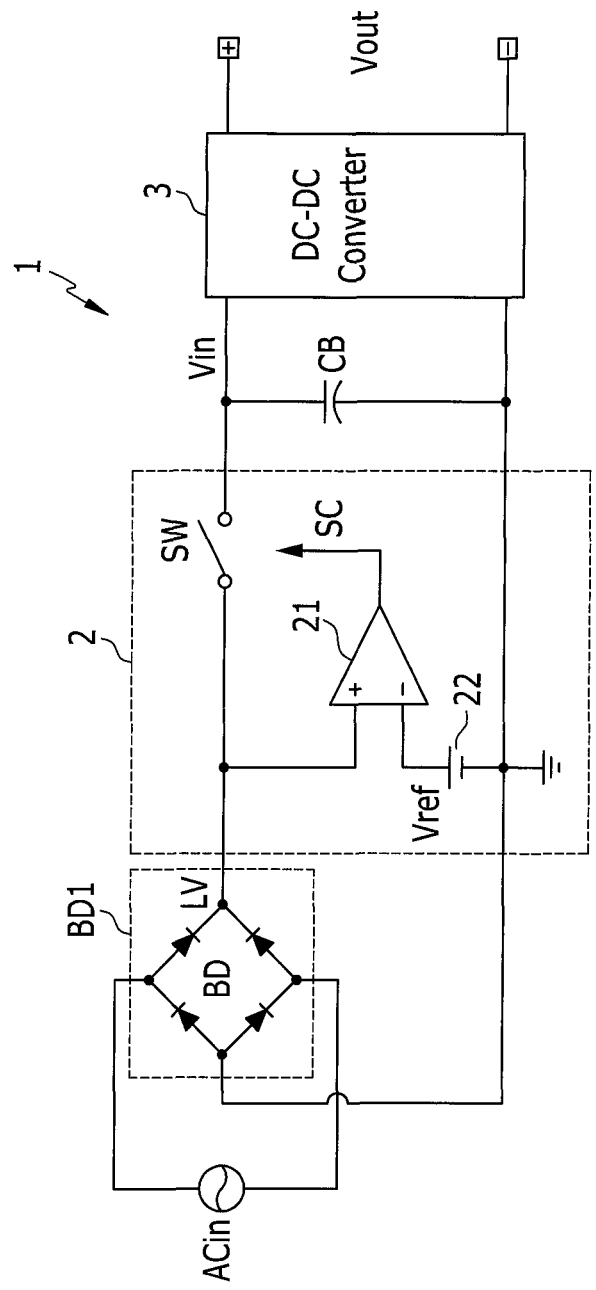
FIG. 4 is a schematic diagram showing a phase-cut pre-regulator according to another embodiment of the present invention.

FIG. 4 is a schematic diagram showing a phase-cut pre-regulator according to another embodiment of the present invention.

As shown in FIG. 4, the power supply 1 according to another embodiment of the present invention receives an AC input ACin and outputs a DC voltage Vout and comprises a bridge diode BD1, a phase-cut pre-regulator 2, a bulk capacitor CB, and a DC-DC converter 3.

The bridge diode BD1 rectifies the AC input ACin and generates a line voltage LV. The bridge diode is an example of a rectifier circuit and another embodiment of the present invention can comprise another rectifier circuit instead of the bridge diode.

The phase-cut pre-regulator 2 receives the line voltage LV and regulates the line voltage LV according to a result comparing the line voltage LV with a predetermined reference voltage VREF.

The bulk capacitor CB is charged or discharged according to a switching operation of the phase-cut pre-regulator 2.

The DC-DC converter 3 converts an input voltage Vin to generate the DC voltage Vout. The input voltage Vin is a voltage of the bulk capacitor CB.

The phase-cut pre-regulator 2 is coupled between the bridge diode BD1 and the bulk capacitor CB and comprises a switching device SW, a comparator 21, and a voltage source 22.

The switching device SW is connected between a line voltage LV of the bridge diode BD1 and an input voltage of the bulk capacitor CB. The switching device SW is switched by an output of a comparator 21, and a switching signal SC. When the switching device SW is turned on, the line voltage LV is supplied to the bulk capacitor CB and the bulk capacitor CB is charged. When the switching device SW is turned off, the bulk capacitor CB is discharged so that the energy stored in the bulk capacitor CB supplies to a load. The load is not shown in FIG. 1, but the load can be connected to the output voltage Vout.

The voltage source 22 supplies the reference voltage VREF.

The comparator 21 comprises an inverted terminal (−) connected to the line voltage LV and a non-inverted terminal (+) connected to the reference voltage VREF.

The comparator 21 receives the line voltage LV and the reference voltage VREF compares the line voltage LV with hysteresis reference voltages VREF1 and VREF2. The comparator 21 generates a switching control signal SC according to the compared result.

The comparator 21 has a hysteresis, the hysteresis reference voltage VREF1 is VREF+½* (a hysteresis voltage of the comparator 21), and the hysteresis reference voltage VREF2 is VREF−½* (a hysteresis voltage of the comparator 21).

Figure 5:
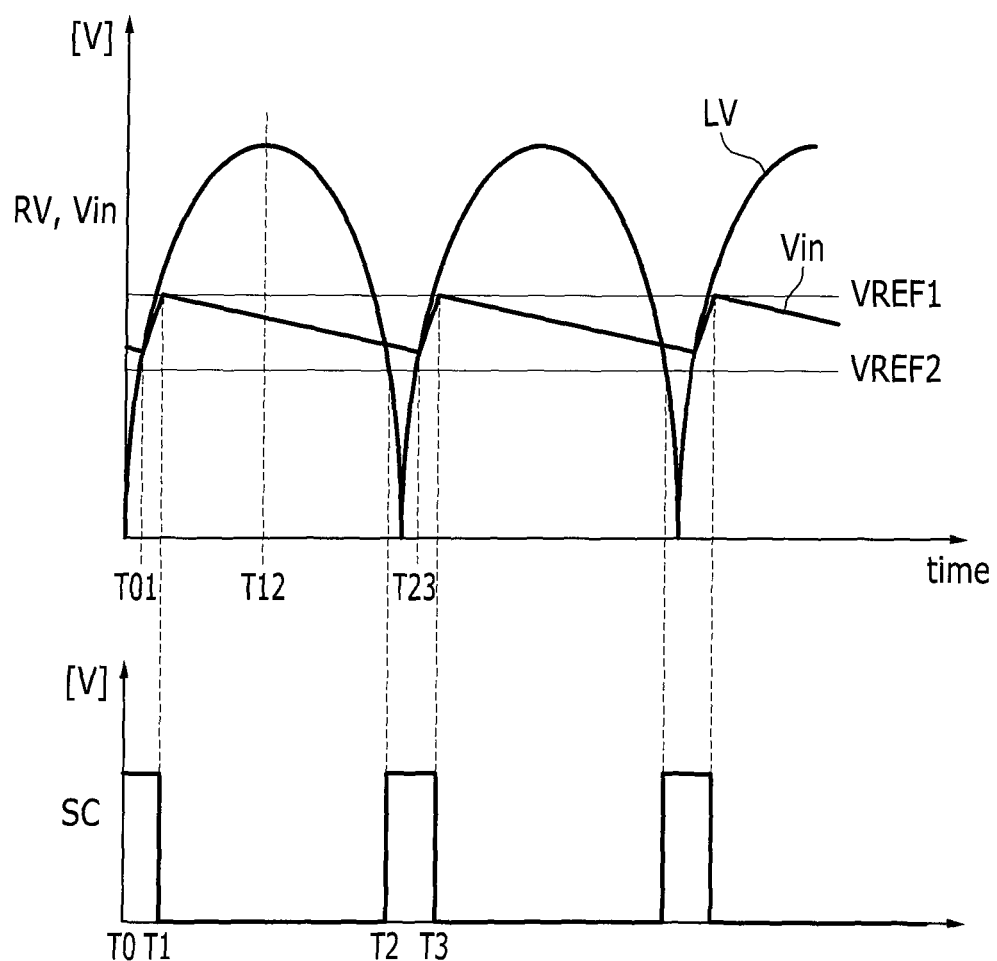
FIG. 5 is a waveform diagram showing the line voltage, the input voltage Vin, and the switching control signal according to another embodiment of the present invention.

Referring to FIG. 5, a driving method of the phase-cut pre-regulator according to another embodiment of the present invention is described.

FIG. 5 is a waveform diagram showing the line voltage, the input voltage Vin, and the switching control signal according to another embodiment of the present invention.

The line voltage LV increases from a time T0 and the line voltage LV reaches VREF1 at a time T1. At the time T1, the comparator 21 outputs a low level switching signal SC and the switching device SW is turned off. As shown in FIG. 5, the comparator 21 generates a high level switching signal SC during the period T0-T1 when the line voltage LV is lower than the VREF1. Then, the switching device SW is turned on during the period T0-T1. During the period T01-T1, the bulk capacitor is charged and the input voltage Vin increases. The input voltage Vin is decreased after the time T1.

The line voltage LV decreases from the peak time T12 and the line voltage LV reaches VREF2 at a time T2. At the time T2, the comparator 21 outputs a high level switching signal SC and the switching device SW is turned on.

As shown in FIG. 5, the comparator 21 generates a low level switching signal SC during the period T1-T2 when the line voltage LV is higher than the VREF2. Then, the switching device SW is turned off during the period T1-T2. During the period T1-T2, the bulk capacitor is discharged and the energy stored in the bulk capacitor CB is supplied to the load.

At the time T23, the line voltage LV reaches the input voltage Vin and during the period T23-T3, the bulk capacitor is charged and the input voltage Vin increases.

The operation of the phase-cut pre-regulator 1 during the period T1-T3 is repeated as shown in FIG. 5. A predetermined phase of the line voltage LV (i.e., corresponding to the period T1-T2) is cut, and the input voltage Vin of the bulk capacitor CB is kept to a suitable level. Therefore, the DC-DC converter is not influenced by the maxima line voltage and can be designed easily.

The present invention is not limited to a one-phase AC input and can be applied to multiple-phase AC input.

Figure 6:
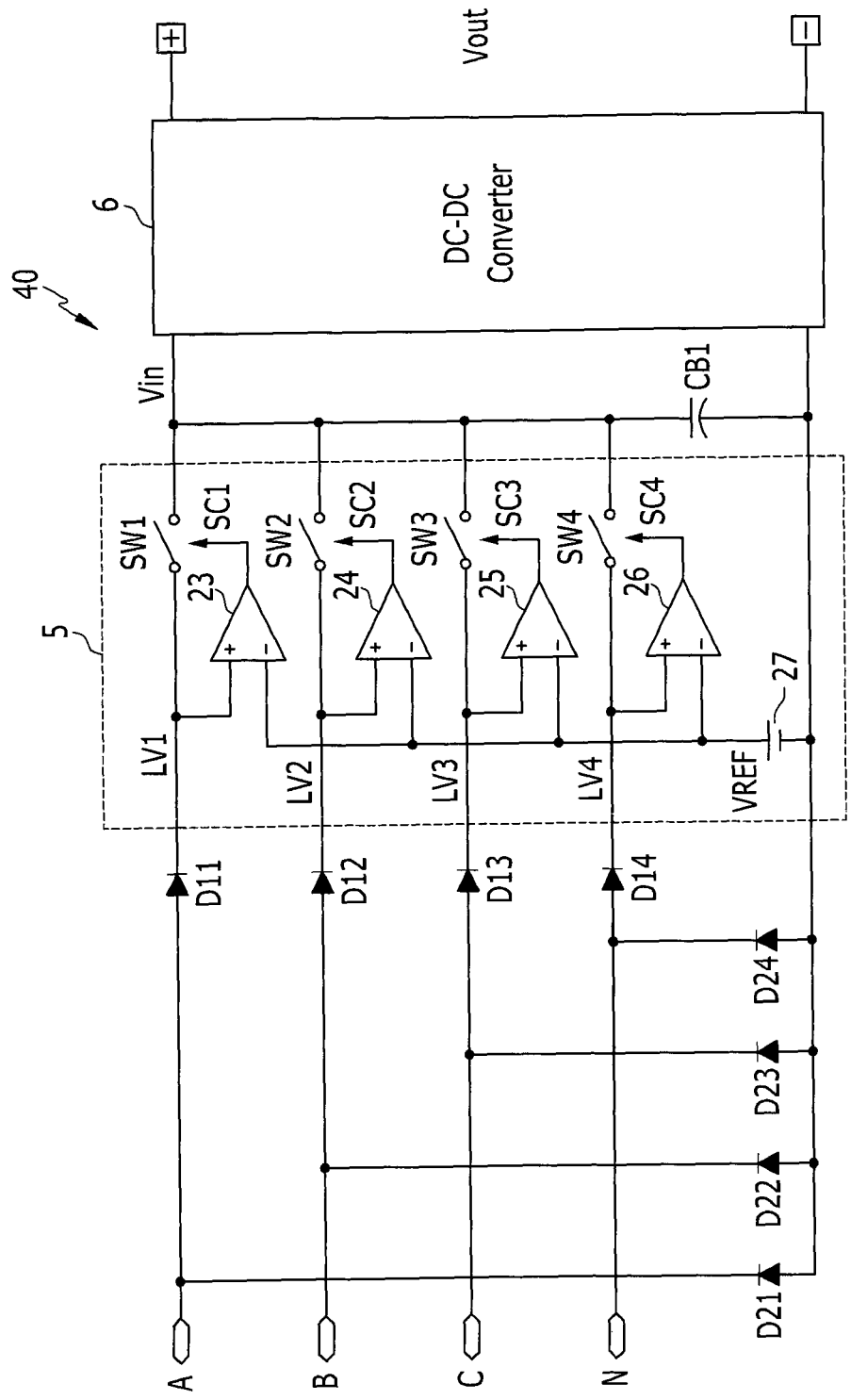
FIG. 6 is a schematic diagram showing a phase-cut pre-regulator according to yet another embodiment of the present invention.

FIG. 6 is a schematic diagram showing a phase-cut pre-regulator according to yet another embodiment of the present invention.

As shown in FIG. 6, the phase-cut pre-regulator 5 is applied to a 3-phase 4-wire AC input of a power supply 4.

The power supply 4 comprises the phase-cut pre-regulator 5, diodes D11-D14 and D21-D24, a bulk capacitor CB1, and a DC-DC converter 6.

The diode D11 is connected between the wire A and the switching device SW1 of the phase-cut pre-regulator 5, and the diode D21 is connected between the wire A and a ground. An AC input of the wire A is rectified by the diode D11 and one of the diode D22, D23, D24 to be a line voltage LV1.

The diode D12 is connected between the wire B and the switching device SW2 of the phase-cut pre-regulator 5, and the diode D22 is connected between the wire B and the ground. An AC input of the wire B is rectified by the diode D12 and one of the diode D21, D23, D24 to be a line voltage LV2.

The diode D13 is connected between the wire C and the switching device SW3 of the phase-cut pre-regulator 5, and the diode D23 is connected between the wire C and the ground. An AC input of the wire C is rectified by the diode D13 and one of the diode D21, D22, D24 to be a line voltage LV3.

The diode D14 is connected between the wire N and the switching device SW4 of the phase-cut pre-regulator 5, and the diode D24 is connected between the wire N and the ground. An AC input of the wire N is rectified by the diode D14 and one of the diode D21, D22, D23 to be a line voltage LV4.

The phase-cut pre-regulator 5 comprises comparators 23-26, switching devices SW1-SW4, and a voltage source 27.

The voltage source 27 supplies the reference voltage VREF.

Switching devices SW1-SW4 are switched by switching signals SC1-SC4. For example, the switching device is turned on by a high level switching signal SC1 and turned off by a low level switching signal SC1.

The comparator 23 comprises an inverted terminal (−) connected to the line voltage LV1 and a non-inverted terminal (+) connected to the reference voltage VREF.

The comparator 23 receives the line voltage LV1 and the reference voltage VREF and compares the line voltage LV with hysteresis reference voltages VREF1 and VREF2. The comparator 23 generates a switching control signal SC1 according to the compared result.

The comparator 24 comprises an inverted terminal (−) connected to the line voltage LV2 and a non-inverted terminal (+) connected to the reference voltage VREF.

The comparator 24 receives the line voltage LV2 and the reference voltage VREF and compares the line voltage LV2 with hysteresis reference voltages VREF1 and VREF2. The comparator 24 generates a switching control signal SC2 according to the compared result.

The comparator 25 comprises an inverted terminal (−) connected to the line voltage LV3 and a non-inverted terminal (+) connected to the reference voltage VREF.

The comparator 25 receives the line voltage LV3 and the reference voltage VREF and compares the line voltage LV3 with hysteresis reference voltages VREF1 and VREF2. The comparator 25 generates a switching control signal SC3 according to the compared result.

The comparator 26 comprises an inverted terminal (−) connected to the line voltage LV4 and a non-inverted terminal (+) connected to the reference voltage VREF.

The comparator 26 receives the line voltage LV4 and the reference voltage VREF and compares the line voltage LV4 with hysteresis reference voltages VREF1 and VREF2. The comparator 26 generates a switching control signal SC4 according to the compared result.

Operation method of comparators 23-26 and the switching devices SW1-SW4 is the same as the operation method of comparator 21 and the switching device SW described above.

When at least one of the switching devices SW1-SW4 is turned on, the bulk capacitor CB1 is charged by at least a corresponding line voltage of line voltages LV1-LV4. For example, the bulk capacitor CB1 is charged by the line voltage LV1 when the line voltage LV1 is highest among line voltages LV1-LV4 in the turn-on time of the switching device SW1.

When the switching devices SW1-SW4 are turned off, the energy stored in the bulk capacitor CB1 is discharged. The energy stored in the bulk capacitor CB1 is discharged when all of the line voltages LV1-LV4 are lower than the voltage on bulk capacitor CB1.

Thus, the phase-cut pre-regulator 5 cuts corresponding phases of the line voltages LV1-LV4 when the line voltages LV1-LV4 are high levels respectively, and the input voltage Vin of the bulk capacitor CB1 is kept to a suitable level. Therefore, the DC-DC converter is not influenced by the maxima line voltage and can be designed easily.

According to aspects of embodiments of the present invention, it is possible to improve the efficiency of the power supply in the standby operation mode through a small additional cost and a small additional power loss in the normal operation mode.

The embodiments of the present invention are not implemented only by a device and/or method, but can be implemented through a program for realizing functions corresponding to the configuration of the embodiments of the present invention and a recording medium having the program recorded thereon. These implementations can be realized by the ordinarily skilled person in the art from the description of the above-described embodiment.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A power supply comprising:
a first rectifier circuit rectifying a first phase AC input of a multi-phase AC input to generate a first rectified AC line voltage;
a bulk capacitor;
a first switching device connected between the first rectified AC line voltage and the bulk capacitor; and
a first comparator receiving the first rectified AC line voltage and a reference voltage, comparing the first rectified AC line voltage with a plurality of hysteresis reference voltages that are based on the reference voltage, and switching the first switching device to cut a predetermined phase of the first phase AC input from charging the bulk capacitor according to a result of comparing the first rectified AC line voltage with the plurality of hysteresis reference voltages,
wherein the bulk capacitor is charged by the first rectified AC line voltage when the first rectified AC line voltage is highest among rectified AC line voltages generated by rectifying the multi-phase AC input in a turn-on time of the first switching device and energy stored in the bulk capacitor is discharged in a turn-off time of all switching devices connected to the rectified AC line voltages.

2. The power supply of claim 1, wherein the first rectifier comprises:
a first diode connected to the first phase AC input and the first switching device; and
a second diode connected to the first phase AC input and a ground.

3. The power supply of claim 1, wherein the first comparator is configured to output a first switching signal to turn-off the first switching device when the first rectified AC line voltage is higher than a first hysteresis reference voltage in the plurality of hysteresis reference voltages.

4. The power supply of claim 3, wherein the first comparator is configured to output the first switching signal to turn-on the first switching device when the first rectified AC line voltage is lower than a second hysteresis reference voltage in the plurality of hysteresis reference voltages.

5. The power supply of claim 4, wherein the first hysteresis reference voltage is higher than the second hysteresis reference voltage.

6. The power supply of claim 1, further comprising:
a second rectifier circuit rectifying a second phase AC input of the multi-phase AC input to generate a second rectified AC line voltage;
a second switching device connected between the second rectified AC line voltage and the bulk capacitor; and
a second comparator receiving the second rectified AC line voltage and the reference voltage, comparing the second rectified AC line voltage with the plurality of hysteresis reference voltages, and switching the second switching device according to a result of comparing the second rectified AC line voltage with the plurality of hysteresis reference voltages.

7. The power supply of claim 6, wherein the second rectifier comprises:
a third diode connected to the second phase AC input and the second switching device; and
at least a fourth diode connected to the second phase AC input and a ground.

8. The power supply of claim 6, wherein the second comparator is configured to output a second switching signal to turn-off the second switching device when the second rectified AC line voltage is higher than a first hysteresis reference voltage in the plurality of hysteresis reference voltages.

9. The power supply of claim 8, wherein the second comparator is configured to output the second switching signal to turn-on the second switching device when the second rectified AC line voltage is lower than a second hysteresis reference voltage in the plurality of hysteresis reference voltages.

10. A power supply comprising:
a first rectifier circuit rectifying a first phase AC input of a multi-phase AC input to generate a first rectified AC line voltage;
a bulk capacitor;
a first switching device connected between the first rectified AC line voltage and the bulk capacitor;
a first comparator receiving the first rectified AC line voltage and a reference voltage, comparing the first rectified AC line voltage with a plurality of hysteresis reference voltages that are based on the reference voltage, and switching the first switching device to cut a predetermined phase of the first phase AC input from charging the bulk capacitor according to a result of comparing the first rectified AC line voltage with the plurality of hysteresis reference voltages;
a second rectifier circuit rectifying a second phase AC input of the multi-phase AC input to generate a second rectified AC line voltage;
a second switching device connected between the second rectified AC line voltage and the bulk capacitor; and
a second comparator receiving the second rectified AC line voltage and the reference voltage, comparing the second rectified AC line voltage with the plurality of hysteresis reference voltages, and switching the second switching device according to a result of comparing the second rectified AC line voltage with the plurality of hysteresis reference voltages.

11. The power supply of claim 10, wherein the first rectifier comprises:
a first diode connected to the first phase AC input and the first switching device; and
at least a second diode connected to the first phase AC input and a ground.

12. The power supply of claim 10, wherein the first comparator is configured to output a first switching signal to turn-off the first switching device when the first rectified AC line voltage is higher than a first hysteresis reference voltage in the plurality of hysteresis reference voltages.

13. The power supply of claim 12, wherein the first comparator is configured to output the first switching signal to turn-on the first switching device when the first rectified AC line voltage is lower than a second hysteresis reference voltage in the plurality of hysteresis reference voltages.

* * * * *